United States Patent
Thorpe

(10) Patent No.: US 7,396,459 B2
(45) Date of Patent: Jul. 8, 2008

(54) INTERNAL UV TREATMENT OF POTABLE WATER SYSTEMS

(76) Inventor: George W Thorpe, 4347 King Ave., Bellingham, WA (US) 98226

( * ) Notice: Subject to any disclaimer, the term of this patent is extended or adjusted under 35 U.S.C. 154(b) by 0 days.

(21) Appl. No.: 10/430,563

(22) Filed: May 5, 2003

(65) Prior Publication Data

US 2005/0000911 A1  Jan. 6, 2005

(51) Int. Cl.
*C02F 1/32* (2006.01)
(52) U.S. Cl. .................................. 210/205; 250/436
(58) Field of Classification Search ............... 210/748, 210/763, 198.1, 205, 256; 96/224; 422/24, 422/186.3; 250/432 R, 435, 436
See application file for complete search history.

(56) References Cited

U.S. PATENT DOCUMENTS

| | | | |
|---|---|---|---|
| 4,179,616 A | | 12/1979 | Coviello et al. |
| 4,362,090 A | | 12/1982 | Whitely |
| 4,676,896 A | * | 6/1987 | Norton ........................ 210/192 |
| 4,762,613 A | * | 8/1988 | Snowball .................... 210/192 |
| 4,857,204 A | * | 8/1989 | Joklik ......................... 210/695 |
| 4,969,991 A | | 11/1990 | Valadez |
| 5,032,241 A | * | 7/1991 | Robertson et al. ...... 204/157.15 |
| 5,126,111 A | * | 6/1992 | Al-Ekabi et al. ......... 422/186.3 |
| 5,151,252 A | * | 9/1992 | Mass ......................... 422/186.3 |
| 5,227,053 A | * | 7/1993 | Brym ......................... 210/143 |
| 5,230,792 A | * | 7/1993 | Sauska et al. .................. 210/97 |
| 5,256,299 A | | 10/1993 | Wang et al. |
| 5,352,359 A | * | 10/1994 | Nagai et al. .................. 210/192 |
| 5,471,063 A | * | 11/1995 | Hayes et al. ................. 250/436 |
| 5,562,820 A | * | 10/1996 | Taoda et al. .................... 210/94 |
| 5,593,737 A | * | 1/1997 | Meinzer et al. ............. 427/512 |
| 5,677,982 A | | 10/1997 | Levine et al. |
| 5,683,589 A | * | 11/1997 | de Lasa et al. .............. 210/748 |
| 5,846,437 A | * | 12/1998 | Whitby et al. ............... 210/748 |
| 5,859,952 A | | 1/1999 | Levine et al. |
| 5,865,959 A | * | 2/1999 | Meinzer et al. .......... 204/157.3 |
| 6,129,845 A | * | 10/2000 | Kim et al. .................... 210/663 |
| 6,139,726 A | * | 10/2000 | Greene ......................... 210/94 |
| 6,156,211 A | * | 12/2000 | Gonzalez-Martin et al. . 210/748 |

(Continued)

FOREIGN PATENT DOCUMENTS

CA  2345995  4/2000

(Continued)

*Primary Examiner*—Frank M. Lawrence
(74) *Attorney, Agent, or Firm*—Todd N. Hathaway

(57) ABSTRACT

A UV disinfectant system for treatment of water resident in a vessel. One or more UV lamps are mounted within the interior of the vessel so as to expose the water stored therein. The vessel may be, for example, a water tank, water heater, water filter or other component which holds a volume of water. A layer of photoreactive material may be formed on an inside surface of a wall of the vessel so as to be exposed to the UV radiation from the lamp. The photoreactive material may be tin dioxide, titanium dioxide, or other material that produces hydroxyl ions in response to UV exposure. The hydroxyl ions flow from the vessel into the piping and other components of the system so as to inhibit microbial action therein. The UV lamps may be mounted in quartz sleeves that surround the lamps for immersion in water and that are supported to protect the sleeves and lamps from vibration damage. The system may also be used to prevent freeze damage to the vessel and water system.

5 Claims, 7 Drawing Sheets

U.S. PATENT DOCUMENTS

Figure 1:
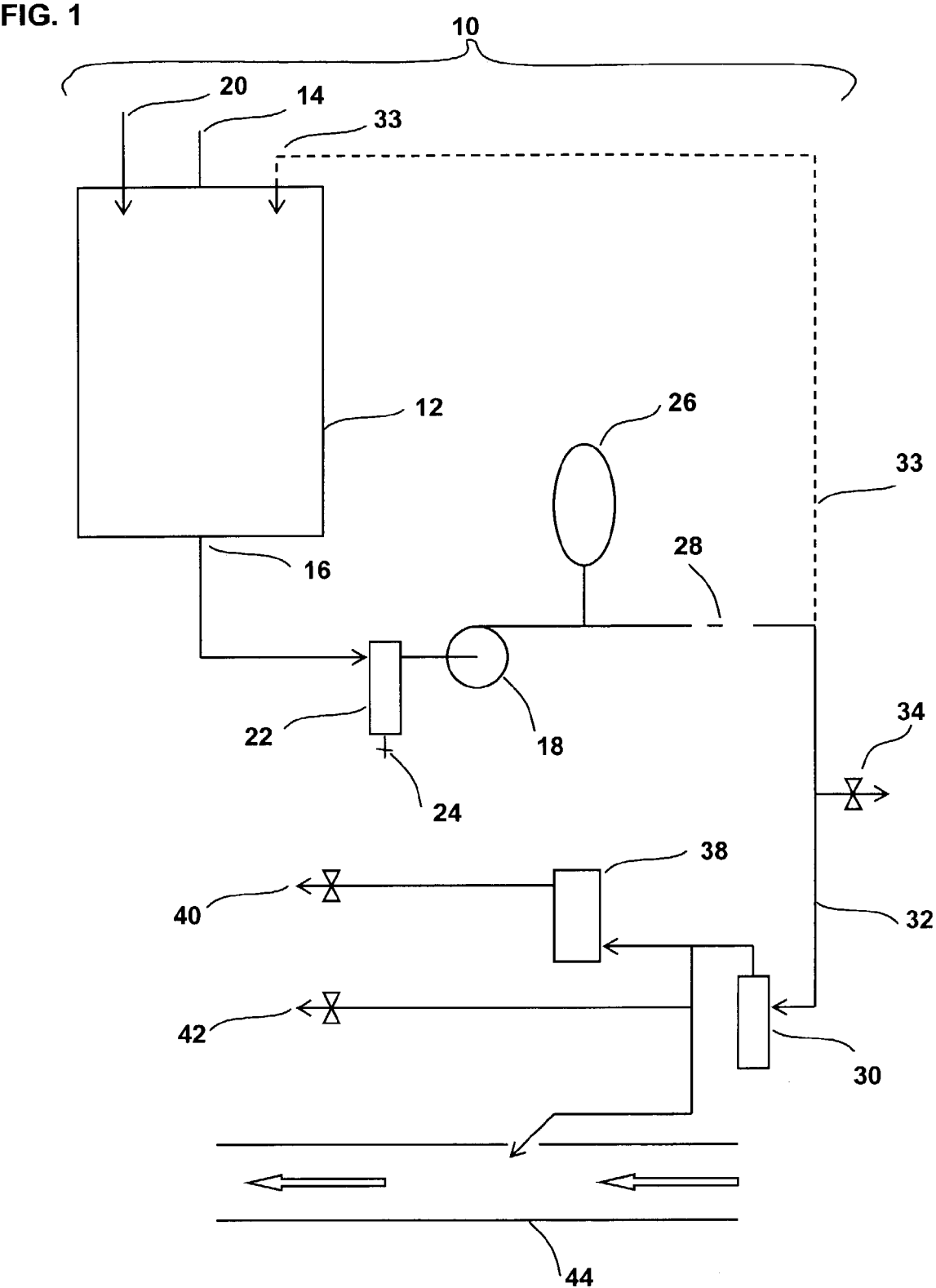

| | | |
|---|---|---|
| 6,245,229 B1 | 6/2001 | Kool et al. |
| 6,312,608 B1 * | 11/2001 | Buckner .................... 210/748 |
| 6,461,520 B1 * | 10/2002 | Engelhard et al. .......... 210/748 |
| 6,469,308 B1 * | 10/2002 | Reed ......................... 250/436 |
| 2003/0021720 A1 * | 1/2003 | Reisfeld et al. ............... 422/4 |
| 2003/0101872 A1 * | 6/2003 | Peel et al. ..................... 96/224 |

FOREIGN PATENT DOCUMENTS

| | | |
|---|---|---|
| DE | 19838007 A1 * | 2/2000 |
| JP | 2002-227255 A * | 8/2002 |
| WO | WO 00/75081 | 12/2000 |

* cited by examiner

INTERNAL UV TREATMENT OF POTABLE WATER SYSTEMS

BACKGROUND a. Field of the Invention

This invention relates to an improved method and apparatus for the inactivation of microorganisms and reduction of biofilm in a self-contained potable water supply, or on the interior surfaces of devices used in the system. This is accomplished in part by installing one or more (UV) germicidal lamps inside at least one and preferably two or more of the following components: potable water tank, faucet, filter, water heater, humidifier. Additional microorganism inactivation and biofilm reduction can be provided through the use of a titanium dioxide, tin dioxide or other UV-activated antibacterial liner on the walls and welds of the components. The potable water supply may be installed in a remote portable structure or in a mobile vehicle such as a train, boat, bus, motor home, aircraft, and the like.

b. Background

Contamination of vehicular and other self-contained water systems is a significant ongoing problem. The World Health Organization estimates that up to one half of vehicle travelers suffer from some type of disease within a week of their trip.

A self-contained potable water supply typically consists of a water tank, a water treatment device, a method of moving the water, piping, a faucet and other water supply devices such as a humidifier. While the water may have started out as high quality drinking water, it soon deteriorates when placed in contaminated tanks and flowed through contaminated piping and devices. Bacteria and biofilm can grow in any of these devices. The moist metal or plastic surfaces are prime breeding areas for bacteria and viruses. The biofilm builds up on the surface until a portion of it sloughs off, eluding normal disinfection methods.

Small self-contained water supplies are often found in remote areas, as in cabins or other small buildings, or on vehicles such as yachts, boats, trains, busses, motor homes and aircraft. These systems store potable water for residents, crew or passengers and can easily become contaminated. Many people do not have a full understanding of bacterial growth. To avoid saving "stale" water in the storage tank, the water is usually drained at or near the end of a trip. The internals of most of the water supply components are consequently subjected to moist air for many hours until the surface dries. Unfortunately, bacteria, viruses and biofilm thrive in these conditions.

Furthermore, the water is often obtained from wells or other reservoirs where quality cannot always be assured. Reference is made to the City of Milwaukee where the city water supply was contaminated by *Cryptosporidium* in 1993. The result was more than 400,000 people sick and over 100 dead. In Las Vegas, the next year, 19 people died of the same pathogen. A serious problem exists that could become disastrous if a city's water supply should become infected and consequently the potable water supplies in such vehicles or other self-contained potable water supplies are filled with contaminated water. The increased potential for intentional contamination by terrorists, e.g., using anthrax or other pathogens, has heightened this concern for both civilian and military users.

Biofilm is a major mode of self-protection for many types of bacteria. The bacteria grow and attach to the surface of piping and fixtures by producing a sticky matrix. Algae and protozoa may also contribute to the colony. As well as water, the biofilm matrix is made up of lipopolysaccharides and acidic exopolysaccharides excreted by the bacteria. The exopolysaccharide and water gel when sufficient calcium ions replace the acidic protons of the polymers. Chlorination is not very effective in reducing bacteria hidden behind the protective biofilm. Bacteria counts taken from the water stream only measure the floating microorganisms, not the number that exists in biofilm attached to the walls of supply components and piping.

It has been discovered that bacteria start the colonization process at a specific location by communicating with each other ("Community Structure and Co-operation in Biofilms", Cambridge University Press, 2001; Scientific American Volume 285, July 2001). Thus, to prevent the start of a biofilm colony, the surface of components and piping must be treated so that either the ability to communicate is blocked or attachment by bacteria is prevented.

Mutually beneficial species like sulfate-reducing bacteria (e.g. *Desulfovibrio vulgaris*) and sulfate-based bacteria (e.g. *Thiobacillus*) cooperate to cause accelerated rates of iron corrosion under a biofilm. *Desulfovibrio vulgaris* produces hydrogen sulphide as a waste product. *Thiobacillus* uses hydrogen sulphide for nourishment, producing sulfuric acid. Both are corrosive and can damage the surface of some iron-based materials. Under the right conditions, biofilm can grow quickly and then slough off pieces into the water supply.

*Cryptosporidium* is a cyst that is spread onto surface waters that eventually drain into water reservoirs. Chlorination is not very effective in the elimination of *Cryptosporidium*, however UV disinfection has proven to be effective even at moderate doses.

As well as pathogenic bacteria viruses may also be present, the latter being the smallest of waterborne pathogenic microorganisms. These viruses, such as those producing infectious hepatitis, poliomyelitis, meningitis, and gastroenteritis, can hide under biofilm among various bacteria species.

Air-borne bacteria and viruses can also contaminate water tanks and humidifiers connected to the potable water system. *Legionella* bacteria came to prominence with the 1976 Philadelphia convention of the American Legion. Several people died of the harsh infection associated with *legionella pneumophila*. Poor cleaning of the biofilm in the air conditioning system was attributed as the cause of the bacterial buildup. The *legionella pneumophila* often grows in conjunction with, and is protected by, biofilm. The air blowing through coils and humidifiers can carry bacteria and viruses through air ducts in a vehicle to where humans are located.

A wide variety of methods have been used over the years to disinfect water, including chlorination in particular. However, recent research has provided strong evidence of health disadvantages associated with using chlorine as a primary means of disinfecting drinking water; for example, the US Environmental Protection Agency has advised that certain chlorine byproducts created during water treatment are carcinogenic. Furthermore, chlorine is not effective in removing biofilm from a water supply and harms the environment.

While also effective as a disinfectant, the use of ozone is discouraged onboard vehicles because of the corrosive nature of the gas, its odor and its harmful nature to humans when the concentration is not properly regulated.

Ultra-violet light (UV) is a very effective disinfecting agent with few, if any, side effects. UV exists in nature, radiating from the sun. UV light adds no chemicals to the water, and therefore creates no health, taste or odor problems. It is well established that germicidal lamps emitting UV light in the 254 nm range are effective at disinfecting most bacteria (including anthrax), viruses and cysts. UV is a preferred method of primary disinfection for water supplies as compared to injecting a moderate level of chlorine (over 1.0 ppm). Furthermore, contrary to ozone, excessive application of UV light at the 254 nM germicidal wavelength does not harm either the potable water or humans drinking the water.

Current practice for UV treatment of self contained water systems is to connect an individual ultra-violet disinfection unit (UVDU) to the pipe exiting the water tank. Installed at this location the UVDU is called Point-of-Entry (POE) or inline disinfection. Although conventional, this method has many deficiencies, including the following:

a) The POE UVDU only disinfects the water flowing through it. It is not effective in disinfecting or removing biofilm in the water tank, filters, accumulator, faucets, humidifier, and so forth. It has been determined by researchers that circulation of UV treated water is not enough to prevent the growth of biofilms in low-flow portions of the piping, rough welded seams, nor in non-UV irradiated components.

b) The POE UVDU is an additional component that takes up extra space that is usually very valuable in limited-size vehicles.

c) The POE UVDU is extra weight that must be carried at the cost of extra fuel and/or reduced range or passenger/load capacity.

d) The POE UVDU and filter can create a pressure drop of more than 10 psi, which is substantial in many low head-pressure water supplies.

e) The POE UVDU takes a considerable amount of time to treat all of the potential bacteria in the water within the supply if the treated water is circulated back to the tank and mixed in with the contaminated water. This is because of the dilution factor of the tank water. To theoretically disinfect all of the bacteria in the tank water typically would take more than a day of circulation.

f) If the POE UVDU fails, system reliability is compromised. Greatly increased reliability would be provided with separate, redundant UV treatment lamps.

g) The POE UVDU can overheat if no water flows through it at least every twenty to thirty minutes, reducing the efficiency of UV output.

Moreover, when non-cylindrical enclosures are used for disinfection devices, a situation can arise where unequal UV intensity exists at different distances from the UV radiation source. If the UV intensity is designed to be greater than necessary, power is wasted and excess heat is created. Another facet of this problem is where rough surfaces, such as welded joints, on interior surfaces of the water tank or other devices harbor bacteria from the direct UV rays, so that the disinfection is not fully effective.

As an ancillary aspect, a common method employed in the prior art for keeping the tanks, piping and apparatus of self-contained water supplies from freezing is to install an electrical heater in the tank and/or have electrical heaters wrapped around the piping. A UV lamp, or multiple lamps, of sufficient size offers a potentially superior solution, as these are able to accomplish both heating and disinfection purposes at a lower power requirement.

c. Related Art

A variety of devices are shown in the prior art that seek to treat water or water vapor with UV light. However, as noted above, in the bulk of these devices the water is exposed to the UV radiation only as it flows through one portion or point in the system. As a result, the treatments are at most only partially effective and the devices share many of the deficiencies discussed above as well as other drawbacks.

Certain other of the prior art illustrates the marginally effective applications of UV treatment in air humidification devices:

Certain of the prior art is directed to UV disinfection prior to storage in or circulation through a tank.

Coviello, et al. (U.S. Pat. No. 4,179,616) describe use of a UV device for disinfecting water or other fluids, where the treated fluid is then sent to a holding tank. Valadez (U.S. Pat. No. 4,969,991) teaches a water disinfection system for vending machines and the like, in which water is purified before placing it into a holding tank, and then circulated past a UV disinfection unit and back to the tank. Wang et al. (U.S. Pat. No. 5,256,299) relates to a large-scale, industrial process for treating contaminated liquid to remove volatile organic compounds. UV treatment only occurs in the mixing section, and in any event the system is by its nature massive and wholly unsuited to portable or vehicular use. Kool et al. (U.S. Pat. No. 6,245,229) disclose a single point-of-use water treatment system unit for home or office use. This is a modular unit having a filter chamber attached to a UV chamber adapted to be placed in-line. None of these references are concerned with or effective at reducing biofilm on the interior of the tank, piping, or the other water supply components.

Thorpe (WO 00/75081 A1) describes a UV device primarily intended for disinfecting potable water in vehicles. This POE UVDU also has many of the limitations described above. While effective for disinfection of water that passes through the unit, it will not control the bacteria, viruses and biofilm that grow in the other devices and piping that are part of the potable water supply.

Walker (Cdn. Pat. No. 2,345,995) discloses a continuously circulating water system that has a reduced sensitivity to the temperature of the surrounding environment, specifically to prevent freezing of the water lines. Walker employs POE water treatment devices, comprising a filter and/or an ultra-violet disinfection device, as the only means of disinfection and therefore shares many of the above deficiencies, e.g, the apparatus will not control the bacteria, viruses and biofilm that grow in the other devices that are part of the potable water supply system.

Levine, et al (U.S. Pat. Nos. 5,677,982 and 5,859,952) teach a humidifier apparatus that only utilizes UV light for disinfection of water in the flow to the heater. This approach does not recognize the dangerous buildup of bacteria and biofilm in the airflow duct where water or mist is introduced. Air-borne bacteria and viruses such as *Legionella pneumophila* can often be present at this type of air/water interface. Whitely (U.S. Pat. No. 4,362,090) describes an air-circulating device placed on the floor of a room with a pair of ducts extending to the ceiling. A humidifier is disposed within the base of the device and uses a sponge to soak up water. Air is passed through the sponge and is humidified. A UV lamp is placed in one of the ducts in an effort to irradiate the airflow. However, no disinfection of the sponge or tank is accomplished, thereby allowing growth of bacteria and biofilm.

Accordingly, there is a continuing need for improved methods and apparatus for improving the quality of water in a self-contained potable water supply and reducing biofilm growth. Unexpectedly, a method and apparatus have been discovered that remove most of the impediments of current potable water supply systems and overcomes the limitations a POE UVDU.

SUMMARY OF THE INVENTION

The above-noted problems, and others, are overcome in accordance with the present invention, by an improved method and apparatus which utilizes one or more germicidal UV lamps inside any one, or several of the individual water-holding components of the potable water supply. Preferably the UV germicidal lamps are installed in two or more of the following devices: water tank, water heater, water faucet, water accumulator, etc. With this arrangement it has been discovered that the conventional POE UVDU can be eliminated from the system.

Experimentation in the present invention has shown that UV lamp or lamps, installed inside dispersed water holding/supply devices, provides much broader disinfection and reliability to the potable water supply than when a POE UVDU is utilized. The reliability increase from having two independent, redundant sources of UV disinfection rather than one, is much more than double. Dispersing the UV lamps also reduces the buildup of biofilms throughout the water supply. This enhanced UV disinfection allows a very low residual level of chlorine, previously added to the municipal water supply, to control bacteria that is in suspension in the water.

The water holding/supply devices act as the container for the UV lamps, eliminating the need for the POE UVDU. The increased system weight of the extra UV lamps and ballasts are more than offset by the weight reduction achieved by eliminating the UVDU.

In a preferred embodiment of the present invention a water storage tank apparatus is fitted with a plurality of horizontal UV lamps. As the level of the water rises in the tank and submerses the UV lamp, the power to the lamp is turned on by a level switch or other device. Likewise, as the water level falls below each lamp, the power to that specific lamp is turned off. A vertical lamp arrangement may also be made to operate in a satisfactory manner. One of the advantages of placing the UV lamps in a water tank rather than a POE UVDU, is the ability of the larger quantity of water to resist warming too quickly and thereby decreasing the UV output of the lamp. The lamps prevent freezing of water in the tank and other components where lamps are installed.

Bacteria and viruses ordinarily thrive in warmer water such as that encountered in a hot water heater. In another embodiment of the present invention a water heater apparatus is therefore fitted with a UV lamp or lamps inside the heating chamber, just upstream of the heating coils. While warm water previously would be very difficult to disinfect with a low-pressure mercury UV lamp, the use of amalgam UV lamps now makes the disinfection of warm water possible. A UV sensing circuit, monitor display and water level cutoff switch can similarly be employed in this embodiment.

Considerable research has been conducted into using Titanium Dioxide ($TiO_2$) and other safe benign bactericides to reduce pathogens on surfaces of food preparation equipment. Research has shown that when activated by UV light, the $TiO_2$ helps to destroy bacteria.

Water supply faucets are particularly notorious for the growth of biofilm at the water/air interface. In a further embodiment of the present invention, a UV lamp may be fitted in the body of each of the faucets so that bacteria and biofilm growth is minimized. Any bacteria and viruses in the water supply are disinfected just before flowing to a user. Again, UV sensing circuit, monitor display and water level cutoff switch can be employed in this embodiment.

As noted above, the combination of UV lamps in one or more of the potable water supply devices allows the POE UVDU to be eliminated. Use of UV lamps in each of the system devices is preferable, however, it will not be necessary in all cases, depending on the components utilized and specific design requirements.

In addition to weight savings and reliability increases provided by the present invention, the system pressure drop is significantly reduced. By eliminating a POE UVDU (through which the total water supply must flow) up to 10 psi of pressure drop can be saved. Moreover, in actual practice, the total water flow must often be divided between two POE UVDUs because of this excessive pressure drop; if these two POE UVDUs can be eliminated, space requirements and system weight will be substantially reduced.

To further enhance the effectiveness of the UV lamp, titanium dioxide ($TiO_2$), tin dioxide ($SnO_2$), and/or another antimicrobial material, can be placed on the interior surface of the tank and other water holding/supply devices. Exposure of the $TiO_2$ or similar coating to the UV radiation induces catalytic oxidation, releasing hydroxyl ($OH^-$) radicals that effectively inactivate aqueous bacteria and other pathogens. In a preferred embodiment, a $TiO_2$ layer is plated onto the material forming the substrate, which may be copper, titanium, tin, aluminum, PVC, fiber-reinforced plastic, stainless steel or other suitable material. The internal welds required to form these devices are also covered by a $TiO_2$ skin or nano crystals to prevent bacteria from growing in the cracks, and secondarily, to protect the substrate material from the UV rays.

It has been discovered that the $TiO_2$ lining decreases the antimicrobial activity near the walls of these irregularly shaped vessels when activated by the UV light emitted from the lamps. In another embodiment, the material used to fabricate the water vessels can be a naturally antimicrobial material such as copper or titanium. It has been observed that the UV lamp will cause the surfaces of these metals to accelerate the inactivation of bacteria and viruses. Other substances that block the microorganism's ability to communicate with each other may be applied as well.

It is a further object of the present invention to flow the product of the photocatalytic oxidation reaction, the hydroxyl radicals ($OH^-$), into the tubing that connects the water holding/supply devices. The $OH^-$ radicals may be produced in increased quantity near the outlet of the UV device using a coated, porous surface that the UV light irradiates. The hydroxyl radicals, having super oxidative properties, will reduce or eliminate microorganism and biofilm buildup throughout the tubing and the non self-disinfecting devices. The hydroxyl radicals also break up harmful chemical compounds that may be in the water supply incidentally. Thus the entire water supply system is kept fit for holding potable water.

It is another aspect of the present invention to replace heaters in the water tank and other devices with UV lamps that both disinfect and warm the water. This provides both protection against freezing and disinfection from the same device.

Regular cleaning of biofilm from the interior of piping and vessels may be conducted, for example, on a yearly basis. A preferred method in the present invention is to pump a dilute solution of hydrogen peroxide ($H_2O_2$) through the system, which reacts with the UV light to create powerful oxidizers. These oxidizers will destroy the biofilm and organic contaminants in the system; yet will not harm the environment as chlorine products are reported to do.

The present invention also discloses an air conditioner and humidifier apparatus attached to the potable water supply that has a UV lamp located in the return air stream, near the mist inlet. Another UV lamp may be placed horizontally in the air conditioning coil drip pan, representing the water-holding component in this component. The lamps will therefore disinfect microorganisms before they establish a colony and build a biofilm. Several advantages are also achieved by placing the UV lamps upstream of the mist: The UV lamps stay cleaner because the mist is not impinging on the sleeve surface, and the UV lamp protects the internal surfaces of the device from bacterial and biofilm buildup such as the *Legionella* bacteria. It is not necessary to cover the UV lamps with quartz sleeves as these specific UV lamps are designed to be surrounded by air, rather than a dense fluid such as water.

These and other features and advantages of the present invention will be more fully understood from a reading of the following detailed description with reference to accompanying drawings.

BRIEF DESCRIPTION OF THE DRAWINGS

FIG. 1 is a schematic view of a potable water supply incorporating the treatment system of the present invention, as this would be installed, for example, in a vehicle or self-contained building;

FIG. 2 is a perspective view of an exemplary potable water device, such as a storage tank, fitted with UV treatment apparatus in accordance with the present invention, showing two UV lamps, connected to a ballast, extracted from the side of the potable water device;

FIG. 3 is an exploded, partially cutaway view of a quartz sleeve that houses one of the UV lamps within the water storage tank of FIG. 2;

FIG. 4 is a perspective view, similar to FIG. 2, showing a second exemplary potable water device, such as a water heater, fitted with UV treatment apparatus in accordance with the present invention, showing the UV lamp and ballast as extracted from the top of the device;

FIG. 5 is an exploded, partially cutaway view, similar to FIG. 3, of a quartz sleeve that houses the UV lamp of FIG. 4 within the water heater;

FIG. 6 is a perspective view, similar to FIGS. 2 and 4, of a water faucet fitted with UV treatment apparatus in accordance with the present invention, showing the UV lamp, together with the ballast and power supply, as extracted from the bottom of the faucet assembly;

FIG. 7 is a perspective, partially cutaway view of the faucet assembly of FIG. 6, showing the quartz lamp installed and fitted in a quartz sleeve within the assembly;

FIG. 8 is a cross-sectional view of a water filter fitted with UV treatment apparatus in accordance with the present invention illustrating the flow of water through the filter element and past inner and outer quartz sleeves that encase the UV lamp;

FIG. 9 is a perspective view, similar to FIGS. 2, 4, and 6, of an exemplary humidifier fitted with UV treatment apparatus in accordance with the present invention, showing the UV lamp and associated ballast having been extracted from the top of the humidifier;

FIG. 10 is a cross-sectional view of an air conditioner and humidifier assembly fitted with UV treatment apparatus in accordance with the present invention, illustrating the flow of air through the assembly and past the quartz sleeve that houses the UV lamp;

FIG. 11 is a cross-sectional, detail view of a straight butt or lap weld formed in the wall of a potable water device and provided with a coating or covering of $TiO_2$, $SnO_2$, or other material having an antibacterial effect when exposed to UV light; and FIG. 12 is a cross-sectional, detail view, similar to FIG. 11, of an angled weld formed in the wall of a potable water device and covered with $TiO_2$, $SnO_2$ or other material that exhibits antibacterial qualities in response to exposure to UV light.

DETAILED DESCRIPTION OF PREFERRED EMBODIMENTS

The following description of the preferred embodiments is not meant to be a limitation of other possible modes for implementing the principles of the present invention.

The present invention provides a system for effective UV treatment of potable water, for a mobile or small self-contained potable water system in which the water is stored or resident in one or more tanks or vessels. By "resident" it is meant that the water rests or remains to some extent within the vessel or other components during operation of the system, as opposed to simply flowing through it. In contrast to the prior art, the present invention thus employs UV light sources that are positioned within the tanks and other vessels, rather than relying solely on a "flow past" approach. The UV lamps are mounted in quartz tubes within the vessels, and are preferably supported against damage by vibration. A similar structure is provided for mounting a UV lamp within the interior of an outlet faucet. In addition, the tanks or other vessels are preferable lined with titanium dioxide ($TiO_2$), tin dioxide ($SnO_2$), or similar materials that activate aqueous microorganisms by catalytic reaction in response to exposure to UV light.

Accordingly, FIG. 1 shows an exemplary potable water system 10 in accordance with the present invention. The system includes a storage tank 12, which typically may hold in the range from 5-500 gallons of drinking water. As is conventional, the tank is provided with an inlet 14 in its upper end for filling or for receiving returned water that is circulated through the system, and an outlet 16 in its lower end from which water is discharged via the system to the user.

Also in a conventional manner, water is drawn from outlet 16 by means of a fluid supply pump 18. Alternatively, the storage tank 12 may be compressed using an air line 20, or in some embodiments gravity may provide a sufficient flow to force water through the system.

A filter 22 is installed in the water line between the storage tank and pump 18 to prevent particulate matter from contaminating the pump and entering the rest of the system. A strainer or magnetic collector may be used in place of or in combination with the filter. The filter may also be used to treat hard water to prevent fouling of the surfaces of the pump, or this may be accomplished using a separate in-line device. A manual or remotely activated drain 24 on the bottom of the filter allows removal of the collected particulates.

A small surge tank 26 is normally connected to the main water line just downstream of pump 18 to stabilize water pressure, and reduce water hammer. Again, this component is somewhat optional and may not be present in all embodiments.

The system as thus far described is generally conventional in its overall configuration. However, in the prior art systems of the type described above, a point-of-entry (POE) or inline Ultratroviolet Disinfection Unit (UVDU) is normally installed in the water line in the area generally indicated by arrow 28 in FIG. 1. As can be seen, neither a POE or a UVDU is installed in the system using the present invention owing to the fact that the UV treatment apparatus of the present invention allows these devices to be dispensed with, together with their inherent disadvantages.

A self-disinfecting carbon filter 30 with integral UV lamp, as will be described in greater detail below, is preferably installed in the potable water supply line 32, to ensure that chlorine and other harmful chemicals are reduced to safe levels, and to disinfect any pathogens.

An optional return line 33, routed back to the inlet 14 of the water tank may branch off from the supply line upstream of the filter, particularly in embodiments that employ a supply pump. Also, an unfiltered water line 34 may optionally branch off from the main supply line to provide water to a lavatory or other device which does not require filtered water.

Downstream of filter 30 the line may be split, with a hot water supply being provided by flowing one leg through a water heater 38. The cold water enters the inlet and contacts the water heater coil, where it is heated in a conventional manner. Hot water is then discharged to a hot water faucet 40, located, for example, in a bathroom or kitchen. A cold water faucet 42, supplied by the other branch, is also typically located in a bathroom or kitchen.

A humidifier 44 may also be mounted downstream of the filter, this being used in some vehicles and remote structures to increase the humidity present in the air. As noted above, this type of device is particularly susceptible to bacteria, virus and biofilm buildup.

FIG. 1 has thus provided an external overview a self-contained water system that incorporates UV treatment in accordance with the present invention. FIGS. 2-10, in turn, show the actual UV-generating components and the manner in which these are mounted and housed within the tanks and other water-holding components of the water system.

Figure 2:
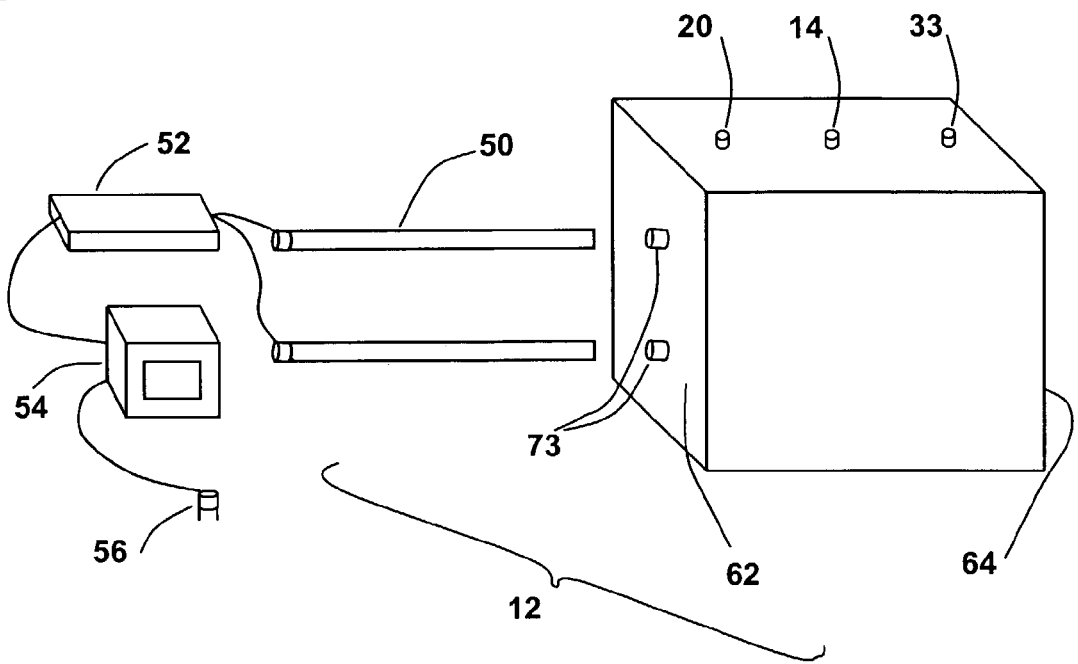
Figure 3:
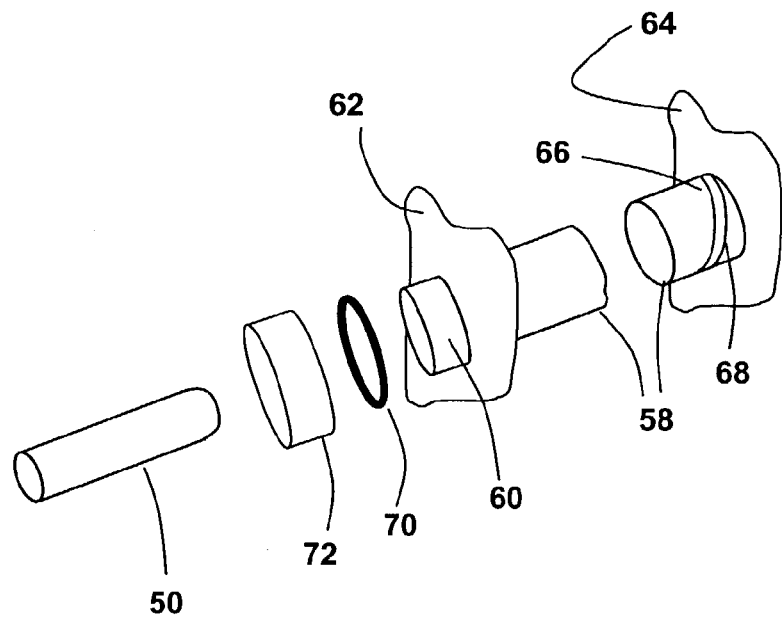

Referring to FIGS. 2 and 3, it can be seen that the water tank 12 encloses two UV lamps 50, which are powered by a ballast 52. The ballast is mounted in a convenient location near the tank, along with a circuit board 54 which regulates the AC or DC input power received via leads 56. The UV lamps are preferably installed in a horizontal orientation, one near the bottom of the tank and the other near the mid-point. A third UV lamp may be desirable in some, relatively tall tanks. The UV lamps are inserted into quartz sleeves 58 and secured. The quartz sleeves are received in ports 60 on the near side 62 of the tank and extend through the interior of the tank to the distal side 64. The quartz sleeves retain the water in the tank and protect the hot UV lamps from the shock of the cold water.

The quartz sleeves may simply extend all the way through the tank, with the ends being sealed to the walls 62, 64 in a suitable manner. Alternatively, as can be seen in FIG. 3, the end 66 of the quartz sleeve may be domed and secured against the distal wall 64 by a spring 68. The helical spring 68 is sized larger than the quartz sleeve at the receiving end and smaller than the quartz sleeve at the end that is affixed to the wall 64. The spring thus securely supports the closed end of the sleeve. An O-ring 70 is placed over the other end of the sleeve and a quartz retainer 72 is attached to the externally threaded port 60. This quartz retainer is tightened so as to push against the O-ring and thereby prevent leakage of water from the tank. A UV lamp 50, connected to a ballast by electrical wires, is then inserted into the quartz sleeve 58 and secured in place. The combination of the spring at one end and the resilient O-ring at the other therefore form a cushioning or shock absorbing suspension or support for the sleeve that shields the sleeve and lamp from damage during periods of severe vibration.

An electronic level switch (not shown) or equivalent level-indicating device is installed immediately above each of the UV lamps. As the level of the water rises in the tank and submerses the lower UV lamp, the electrical power to the lamp is turned on by the level switch. As the level of the water submerses the upper UV lamp or lamps, the power to the lamp is turned on by the next level switch. Likewise, as the water level falls below each lamp, the power to that specific lamp is turned off. Thus the water level sensors will automatically shut off the power to the ballast when the water falls to a predetermined level relative to each lamp and turn the power on when each lamp is immersed. The water temperature is preferably monitored to protect the tank from freezing, with additional power being supplied to the UV lamps to provide extra heat (e.g., to prevent freezing) when needed.

A sensing circuit for each UV lamp apprises users/operators of the condition/operation/status of the lamp and therefore its ability to disinfect the water. This is provided by means of a UV monitor display that is mounted in a location visible to the users, e.g., on or near a control panel in a vehicle.

Figure 4:
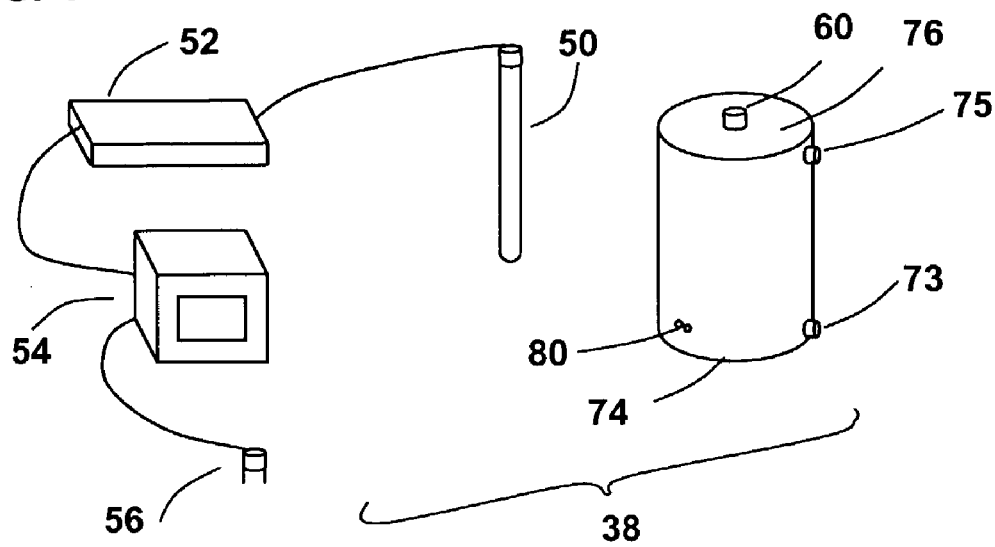
Figure 5:
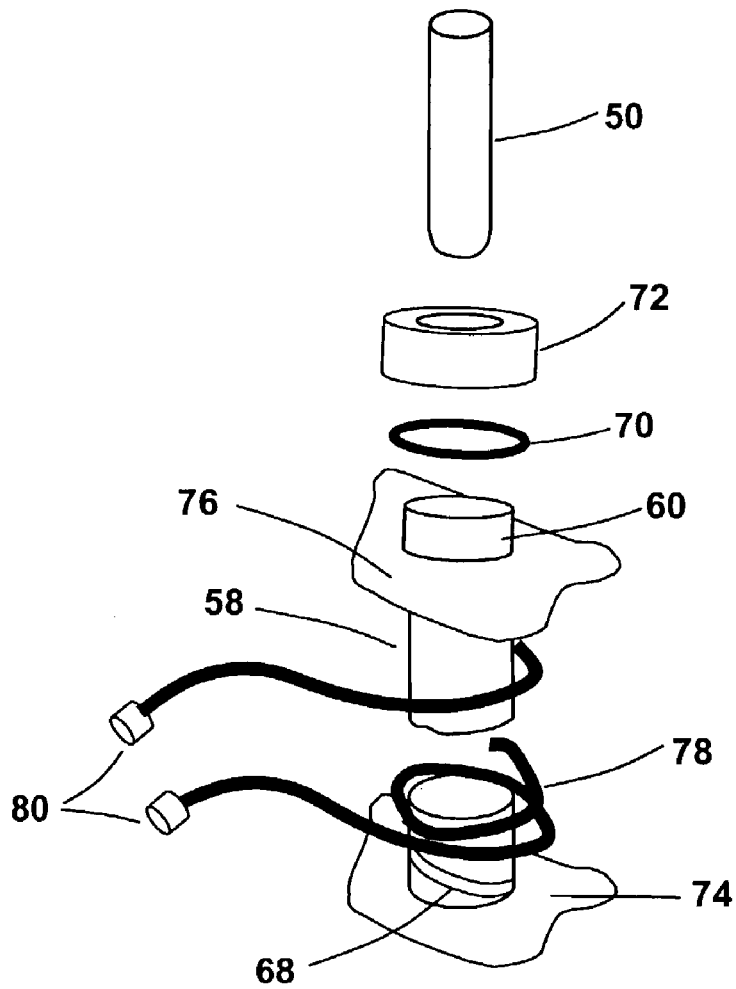

FIGS. 4 and 5 show the manner in which a UV light source in accordance with the present invention is installed in the self-disinfecting water heater 38 of FIG. 1. The installation is similar to that of the storage tank, although in this instance there is a single amalgam UV lamp. The UV lamp 50 will be powered by the ballast 52 only when water is at a level sufficient to cover the lamp: Water level sensors automatically shut off power to the ballast when the water falls to a predetermined level, and turn the power on when the lamp is immersed. In a preferred embodiment, the dome ended quartz sleeve 58 is again secured against the bottom wall 74 of the tank by a coiled spring, and an O-ring is placed over the end of the sleeve and compressed against the port 60 in the top wall 76 of the heater by a quartz retainer 72. Circuit board 54 regulates the AC or DC input power 56 to the UV lamp 50. The UV lamp 78 is positioned in the heater chamber to prevent pathogen growth, with the heater element coiled around the quartz sleeve 58. Electrical power is supplied to connectors 80. A separate water level switch controlling the heater element 78 is normally required in this application because the water heater power is ordinarily turned on whenever system power is on.

Figure 6:
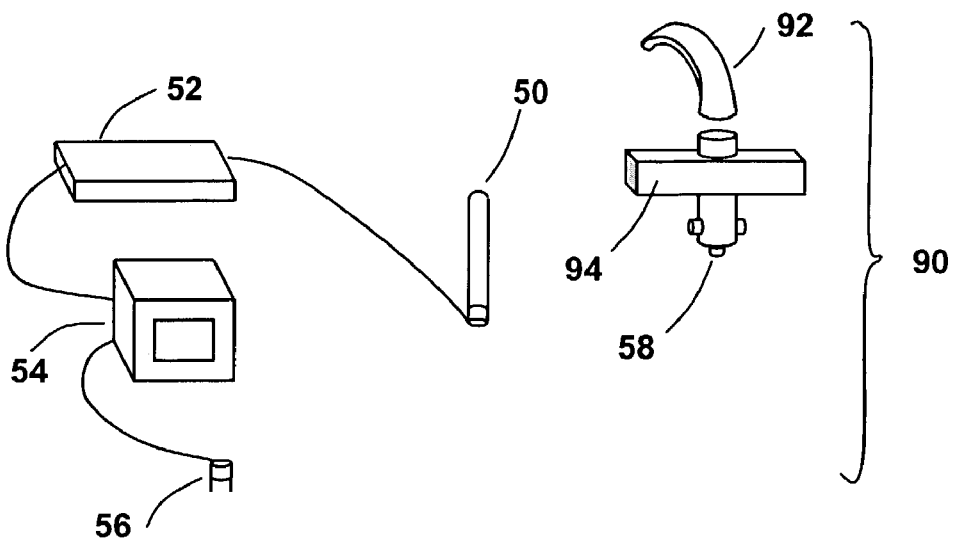
Figure 7:
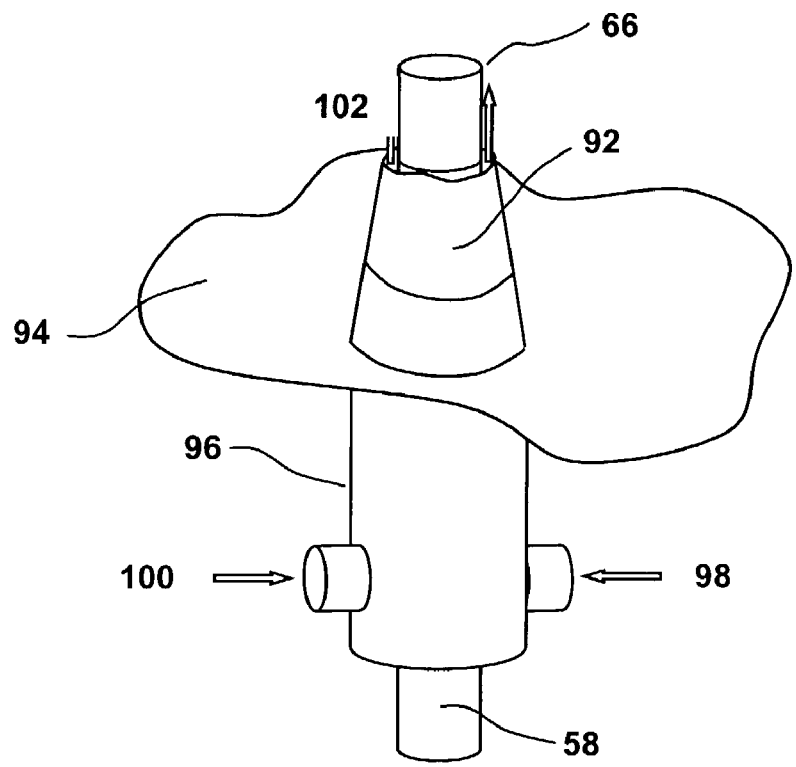

FIGS. 6 and 7 show a self-disinfecting potable water faucet 90 for use in the system of the present invention, wherein a single UV lamp 50 is installed internally in the faucet. The domed, closed end 66 of the quartz sleeve 58 is preferably centered in the spout 92 of the faucet, with the open end of the quartz sleeve protruding out the bottom of faucet base 94. As can be seen, the water chamber 96 leading to the spigot includes inlets 98, 100 for cold and hot, the cold water supply 42 (see FIG. 1) being attached to cold water inlet 98 and the hot water supply 40 being attached to the hot water inlet 100. The mixed hot and cold supply water flows around the quartz sleeve 58 as indicated by arrows 102 in FIG. 7 and is disinfected before exiting out the spigot.

As with the other installations, the UV lamp will be powered only when water is at a level sufficient to cover the lamp. Water level sensors automatically shut off the power to the ballast when the water falls to a predetermined level and turn the power on when the lamp is immersed.

Figure 8:
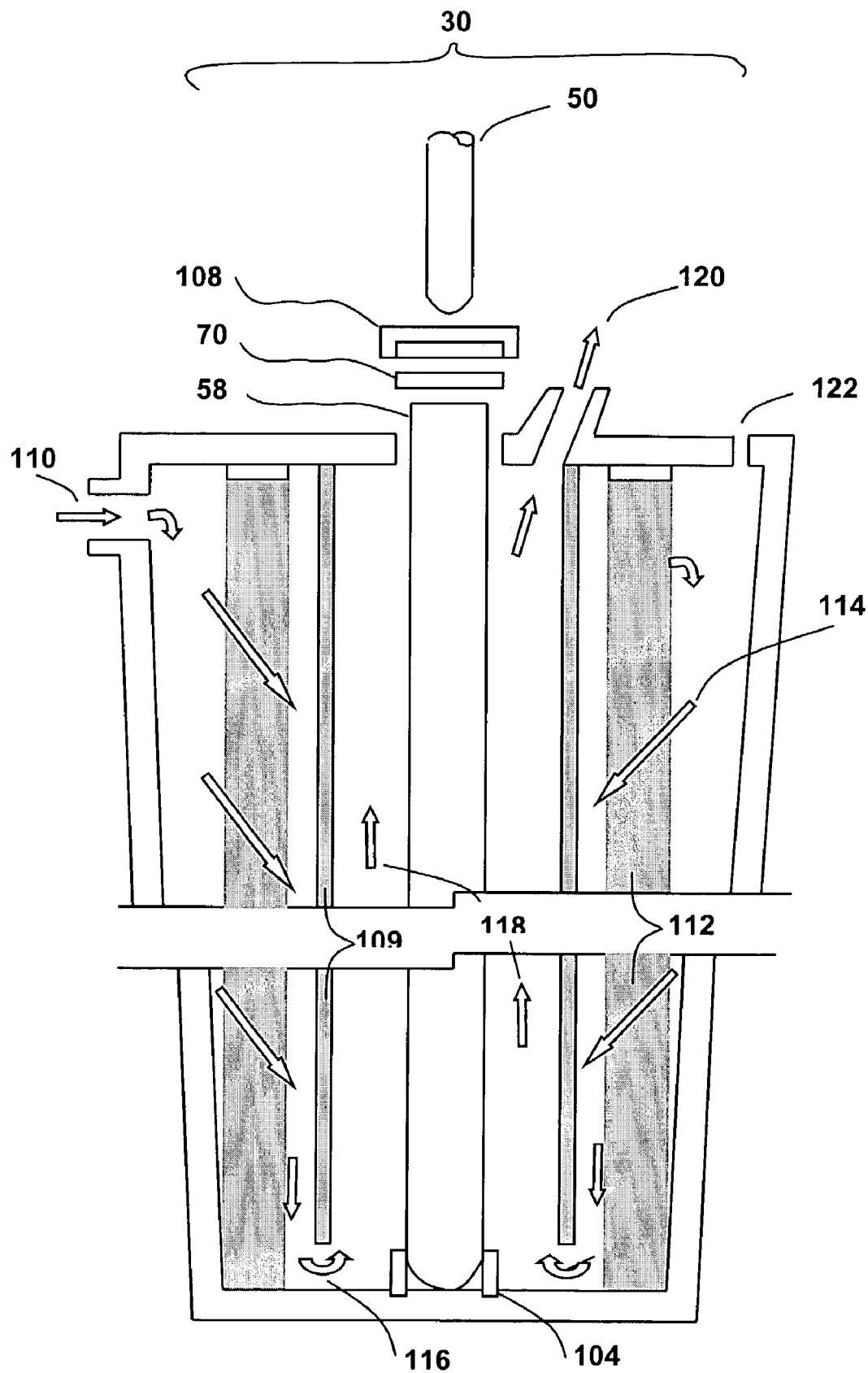

FIG. 8 shows the manner in which the self-disinfecting water filter 30 of FIG. 1 is provided with UV treatment in accordance with the present invention. In the illustrated embodiment, a single UV lamp is centered in a cylindrical carbon-filter cartridge, with the water following a double flow path past the lamp. As above, the domed end of the quartz-sleeve cylinder 58 is preferably secured in the bottom 104 of the filter housing or sump 106 to prevent damage due to shock or vibration. Similarly, the quartz sleeve is held in place at the top with an O-ring 70 and a quartz retainer 108, in this case of a press-fit type. In addition, a second, outer quartz sleeve 109, having both ends open, is placed concentrically around the UV lamp and secured firmly in place. Unfiltered water thus enters the inlet port 110 and penetrates the carbon filter 112 so as to flow downwardly (see arrows 114) around the outer quartz sleeve 109. In so doing, the water receives an initial dose of UV disinfection. The water then flows through a gap or opening 116 under the outer quartz sleeve 109 and back upwardly, in the direction indicated by arrows 118. The water thus makes a second pass, filling upwardly around the inner quartz sleeve 58 so as to receive an additional, secondary dose of UV radiation. The disinfected water then exits through outlet port 120. As with the installations described above, a water level sensor or sensors automatically deenergize power to the ballast when the water falls to a predetermined level, and reenergizes the power when the lamp is fully immersed. The housing 106 also includes an air bleed valve 122 for purging air as necessary.

In some embodiments the filter may incorporate other treatment materials and elements, such as a water softener, for example. The filtering system may also include a prefilter or a other filter in the strainer 22.

Figure 9:
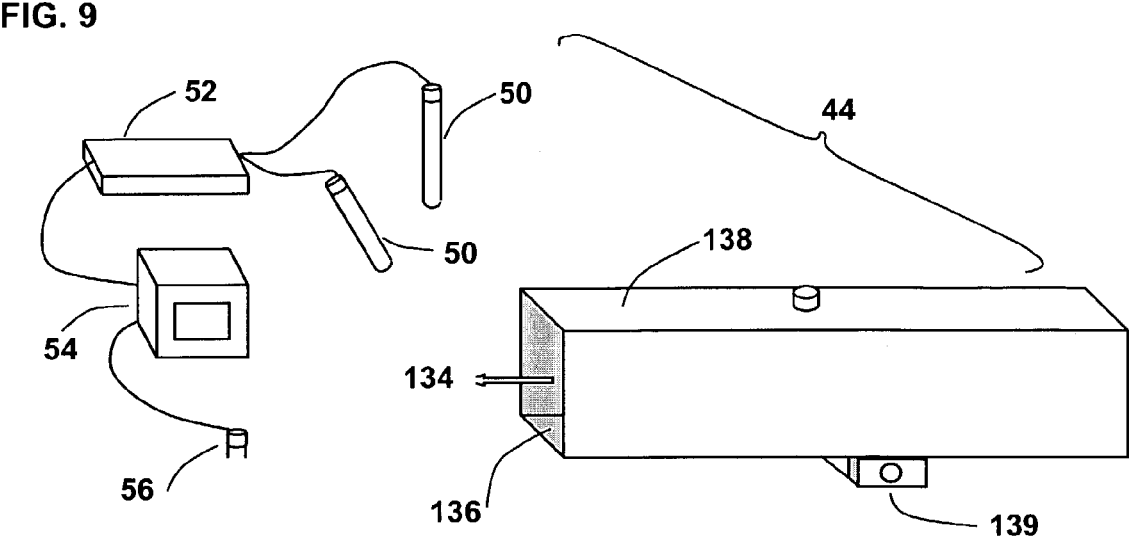
Figure 10:
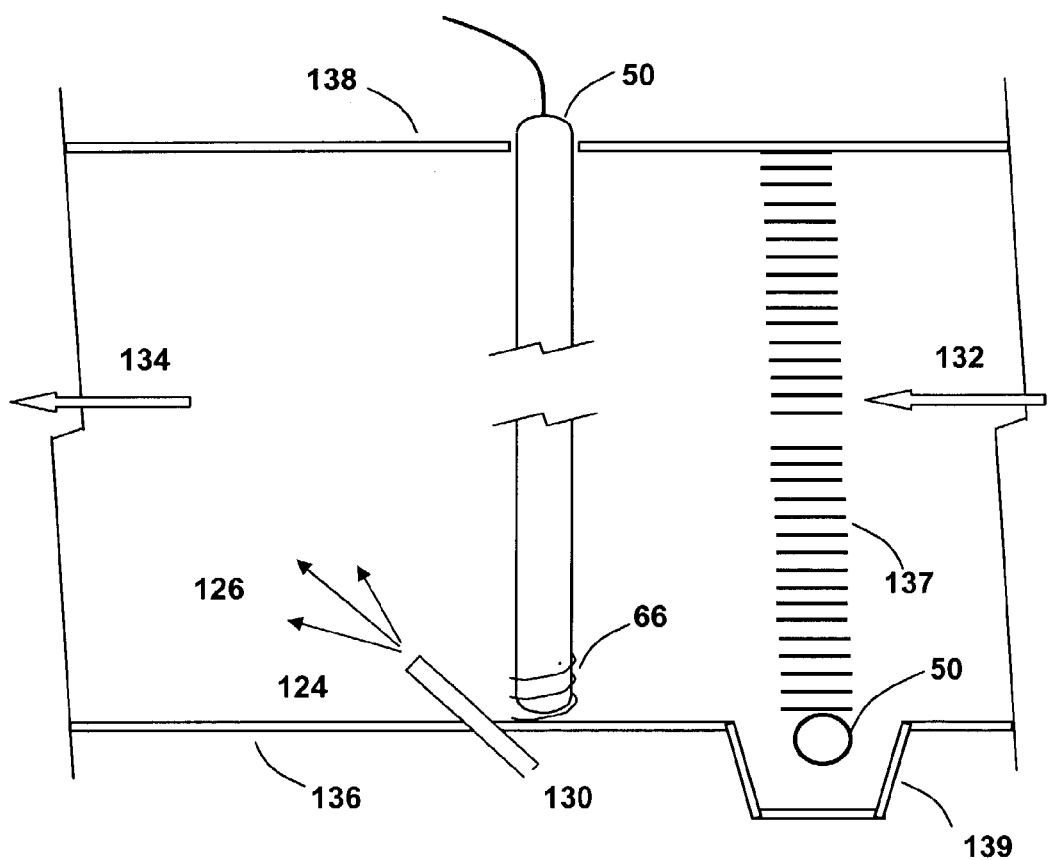

FIGS. 9 and 10 show the self-disinfecting air conditioner and humidifier 44 having internal UV lamps in accordance with the present invention. The humidifier includes a mist inlet 124 that delivers mist 126 from the water supply 130 into the air stream, so that the flow transitions from low-humidity air 132 to humidified air 134. At least one UV lamp 50 is mounted in the interior of the humidifier generally perpendicular to the direction of the air flow. The lamp may be mounted vertically or horizontally or in other orientations. The UV lamp may be continuously powered by ballast or other power when the air fan is energized. Bacterial growth in the air duct is thus discouraged by the strategic placement of the UV lamp or lamps in the airflow channel. In addition, another UV lamp or lamps may be mounted horizontally under the air conditioner coil 137, in the drip pan 139 of the assembly.

The UV lamp itself is designed to normally operate in air and moreover is located upstream of the misting inlet 124, so that it will not ordinarily require a quartz tube to shield it within the interior of the humidifier. In some embodiments, however, a closed-ended quartz sleeve may be used to protect the UV lamp, so, similar to the installations described above. The quartz sleeve being secured to the lower wall 136 of the humidifier by a coiled spring 66 and to the top wall 138 by a retainer so as to prevent damage due to vibration.

In addition to direct UV exposure, the treatment provided by the present invention is further enhanced in the preferred embodiment by employing an antibacterial coating or coatings on internal surfaces of components in the system, particularly those exposed to UV light generated by the internally-mounted lamps. As was noted above, it has been established that certain compounds, including in particular titanium dioxide ($TiO_2$) and tin dioxide ($SnO_2$), create an antibacterial effect when exposed to UV light. This is generated through a photocatalytic oxidation reaction, as exemplified by $TiO_2$ as follows:

(i) UV light irradiates nano-structured $TiO_2$ catalyst.
(ii) $TiO_2$ molecules absorb photons of UV light energy.
(iii) An electron in the $TiO_2$ transfer from the valence band to the conductor band.
(iv) The activated $TiO_2$ generates hydroxyl ($OH^-$) radicals in the water from oxygen ($O_2$) or ozone ($O_3$).
(v) The hydroxyl radicals attack pathogens and organic contaminants due to superoxidative properties, reducing organic compounds to $CO_2$ and $H_2O$.

The layer of $TiO_2$, $SnO_2$ or other photocatalytic, antibacterial material may be applied over the entire interior surfaces of the tanks or other vessels that house the UV lamps, or it may be limited to selected areas or locations where microbial action may be concentrated or most pronounced. For example, the irregularities associated with welds can provide a substrate that fosters bacterial development, and that may also shield the bacterial from direct UV exposure.

Figure 11:
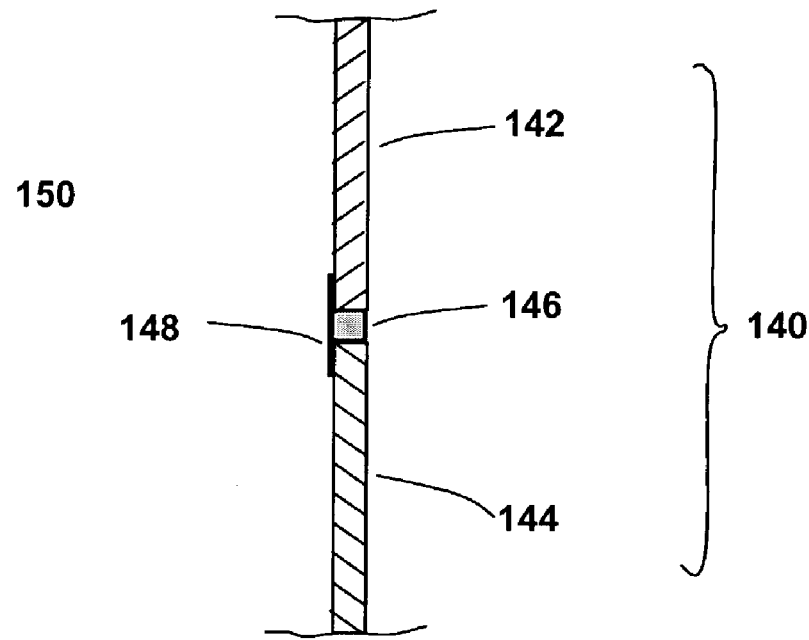

Accordingly, FIG. 11 shows a cross-section of a butt weld wall 140 that joins sections 142, 144 of a tank or other component in the potable water system of the present invention. As noted above, the surface 146 of the weld is comparatively rough, and unlike the surrounding metal it is not easily polished. The weld area also tends to have high porosity, allowing bacteria to attach and colonize in this area. To overcome this problem, a thin covering 148 of $TiO_2$ or other photocatalytic antibacterial material is deposited or otherwise applied over the surface of the weld on the internal side 150 of the vessel. When exposed to UV light generated by the lamp or lamps within the vessel, the layer of $TiO_2$ releases hydroxyl radicals into the water 115, producing an antibacterial effect in the vicinity of the weld.

Figure 12:
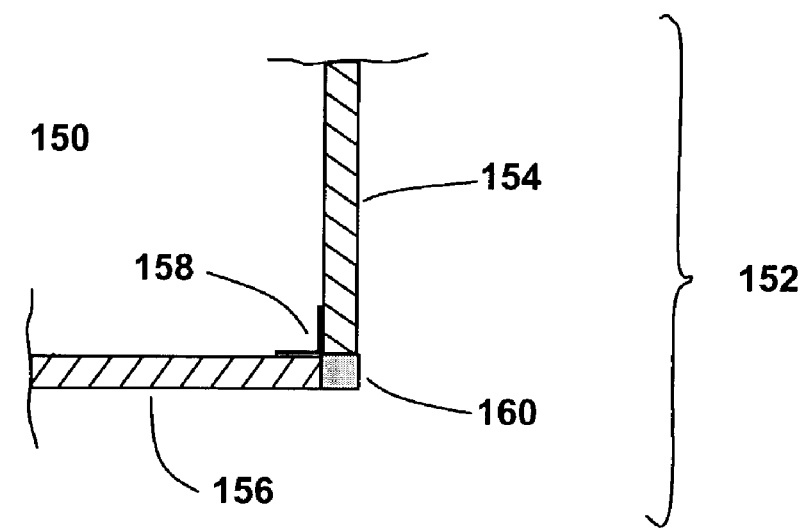

Similarly, FIG. 12 shows an angled weld 152 in the wall of the tank or other welded component in the potable water system of the present invention. The two pieces of metal 154, 156 join and are welded at a corner or other angle, and a thin covering 158 of $TiO_2$ or other photocatalytic antibacterial material is again placed over the weld area 160.

Coatings of $TiO_2$, $SnO_2$ or other photocatalytic antibacterial materials, alone or in combinations thereof or with other materials, thus may be applied over the inside surfaces of welds, joints, and other irregularities/discontinuities in the tanks, ducts and other components throughout the system, wherever there will be exposure to UV light. Alternatively, the entire interior surface or surfaces of the components (or significant portions thereof) may be covered in their entireties with a thin covering of the $TiO_2$ and other antibacterial materials. For example, the water storage tank and other vessels in the system may be formed of stainless steel coated on the inside with $TiO_2$ or $SnO_2$. Although this may involve somewhat higher cost than only coating the welds and joints, the expense may be somewhat offset by reduced need to achieve a higher polish on the inside surfaces of the stainless steel. Moreover, it has been found in the present invention that the $TiO_2$ or other photocatalytic coating helps ensure effective treatment in rectangular or other angular or irregularly-shaped tanks where the full intensity of the light from the UV lamp or lamps will not reach into the corners and recesses of the vessel.

It will be understood that the photocatalytic antibacterial coating employed in the preferred embodiment may not be present in all embodiments of the invention, i.e., in some embodiments the UV lamps may be used without the coating of photocatalytic material being present.

The foregoing description provides just one example of many possible constructions, configurations, and materials for implementing the present invention. Various alternative configurations and materials may be equally adequate for delivering the attributes that the preferred embodiment provides. It is therefore to be recognized that various alterations, modifications, and/or additions may be introduced into the constructions and arrangements of parts described above without departing from the spirit or ambit of the present invention as defined by the appended claims.

What is claimed is:

1. A potable water system, comprising:
   a faucet within which a volume of potable water resides substantially at rest for an extended period when said faucet is closed;
   at least one UV lamp mounted in said faucet so as to subject said volume of potable water therein to antimicrobial UV radiation during said period in which said water resides in said faucet and so as to expose at least one interior surface of a wall of said faucet to said UV radiation; and a layer of photoresponsive material formed on said at least one interior surface of a wall of said vessel for producing an antibacterial effect in response to receiving UV radiation from said lamp;
said photoresponsive material being a photocatalytic material selected from the group consisting of:
  titanium dioxide;
  tin dioxide; and
  combinations thereof.

2. A potable water system, comprising:
at least one vessel in which a volume of water is resident for an extended period during operation of said system, said at least one vessel being a water storage tank for holding water at varying levels therein.
a plurality of UV lamps mounted generally horizontally at different levels in said tank, so as to subject said volume of water to antimicrobial UV radiation during said period in which said water is resident in said vessel, each of said UV lamps being enclosed within a protective quartz sleeve in said interior of said vessel and being immersed in water during operation of said system; and
means for energizing each said UV lamp in response to water rising to a predetermined level in said vessel at which said lamp is covered by said water, and for deenergizing said lamp in response to said water falling below said predetermined level.

3. The potable water system of claim 2. wherein said means for energizing said UV lamp comprises at least one level sensor mounted in said vessel.

4. A potable water system, comprising:
at least one vessel in which a volume of water is resident for an extended period during operation of said system;
at least one UV lamp mounted in said vessel so as to subject said volume of water to antimicrobial UV radiation during said period in which said water is resident in said vessel; and
a layer of photoresponsive material in said vessel for producing an antibacterial effect in response to receiving UV radiation from said lamp, said layer of photoresponsive material being formed over welds in said vessel.

5. A water system, comprising:
a drip pan of a humidifier, in which a volume of water is stored substantially at rest during operation of said system;
at least one UV lamp mounted in said drip pan so as to subject said volume of water at rest therein to antimicrobial UV radiation during a period in which said water is resident in said drip pan; and
a layer of photoresponsive material in said drip pan for producing an antibacterial effect in response to receiving UV radiation from said lamp.

* * * * *